United States Patent [19]

Evans et al.

[11] Patent Number: 4,854,423
[45] Date of Patent: Aug. 8, 1989

[54] HYDRAULIC DISC BRAKE DRUM-IN-HAT PARKING BRAKE ASSEMBLY

[75] Inventors: Anthony C. Evans; Larry L. Last, Northville, both of Mich.

[73] Assignee: Kelsey Hayes Company, Romulus, Mich.

[21] Appl. No.: 224,096

[22] Filed: Jul. 26, 1988

[51] Int. Cl.⁴ .............................................. F16D 63/00
[52] U.S. Cl. ................................ 188/70 R; 188/73.45; 188/218 A; 188/106 F
[58] Field of Search ............. 188/73.46, 70 R, 218 A, 188/106 F, 73.43, 73.44, 71.1, 71.8, 73.39, 73.42, 73.45, 2 D, 329

[56] References Cited

U.S. PATENT DOCUMENTS

| 1,887,478 | 11/1932 | Blazek | 188/218 A |
| 3,850,266 | 11/1974 | Hesskamp et al. | 188/70 R |
| 4,228,726 | 10/1980 | Rinker et al. | 188/71.8 |
| 4,311,219 | 1/1982 | Watanable et al. | 188/71.8 |
| 4,313,528 | 2/1982 | Ito | 188/218 A |
| 4,360,079 | 11/1982 | Belart | 188/73.39 |

FOREIGN PATENT DOCUMENTS

| 0052372 | 5/1982 | European Pat. Off. | 188/71.1 |
| 0716532 | 10/1966 | Italy | 188/106 F |

Primary Examiner—Andres Kashnikow
Assistant Examiner—Mark T. Le
Attorney, Agent, or Firm—Ralph J. Skinkiss; Paul J. Rose

[57] ABSTRACT

A generally hat-shaped disc for a disc brake system is provided with an inner cylindrical surface serving as the drum of a drum in hat parking brake. A unitary backing plate supports the parking brake assembly and provides integral mounting parts for the fist type sliding caliper of the disc brake assembly.

7 Claims, 6 Drawing Sheets

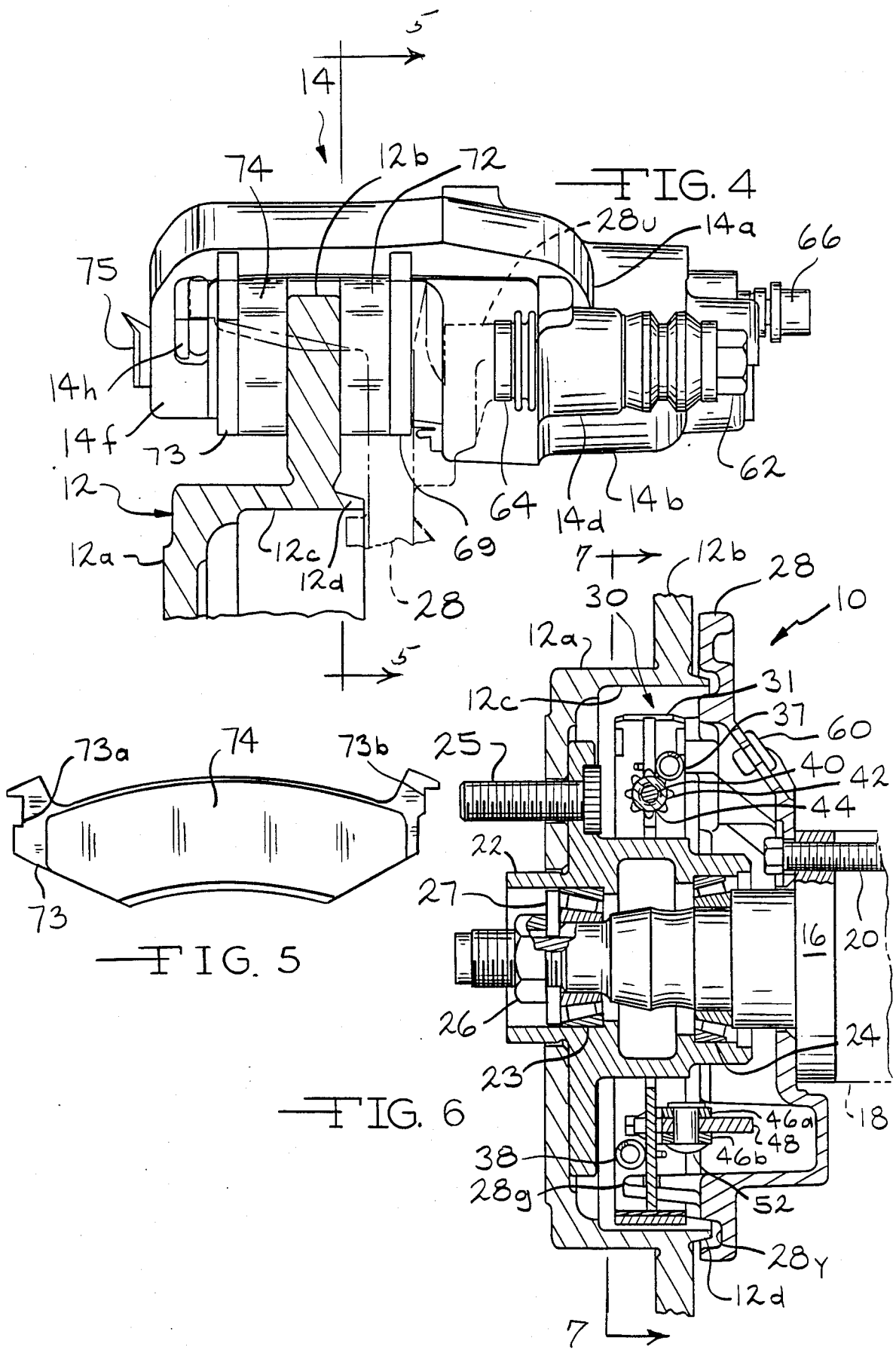

HYDRAULIC DISC BRAKE DRUM-IN-HAT PARKING BRAKE ASSEMBLY

BACKGROUND OF THE INVENTION

This invention relates to floating-caliper disc brakes for automotive vehicles, and more particularly to a hydraulic disc brake having a drum-in-hat parking brake associated therewith.

U.S. Pat. No. 4,228,726 discloses a hydraulic disc brake. When such a disc brake is used as a rear wheel brake on an automotive vehicle, provision must be made to include an emergency or parking brake. Previous attempts to incorporate an emergency or parking brake with a disc brake have resulted in complicated and costly mechanisms that have only gone into limited use.

SUMMARY OF THE INVENTION

In accordance with the invention, a drum-in-hat type brake is associated with a hydraulic disc brake to serve as an emergency or parking brake. A unitary brake support casting serves as the drum brake backing plate and also replaces the disc brake anchor plate. Further, a labyrinthine seal between the brake support casting and the disc is provided by an annular projection on the disc and a corresponding groove in the brake support casting.

The invention is more fully explained hereinafter, reference being had to the accompanying drawings.

BRIEF DESCRIPTION OF THE DRAWINGS

FIG. 4 is a view taken generally along the line 4—4 of FIG. 3, the disc being partially shown in section and the unitary casting, for supporting the drum-in-hat parking brake mechanism and the disc brake caliper, being partially shown in phantom;

FIG. 5 is an elevational view of an friction pad assembly for the caliper taken generally along the line 5—5 of FIGS. 3 and 4.

FIG. 6 is a sectional view taken generally along the line 6—6 of FIGS. 1 and 7;

DESCRIPTION OF THE PREFERRED EMBODIMENT

Figure 1:
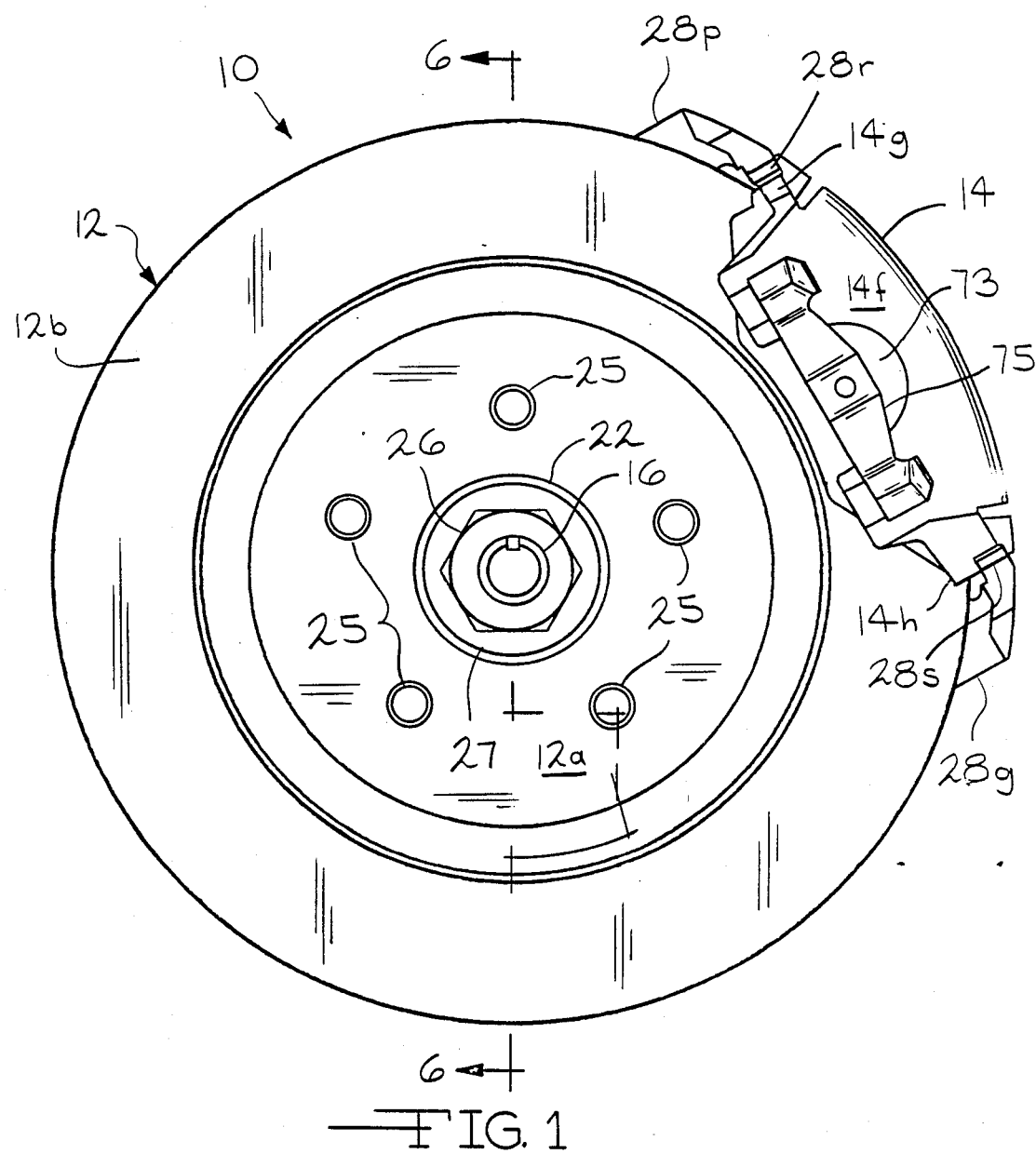
FIG. 1 is an outboard elevational view of a hydraulic disc brake and drum-in-hat parking brake assembly constructed in accordance with the invention, the assembly as shown normally being associated with a left rear wheel of a vehicle, but being shown as it would appear with the wheel and wheel lug nuts removed.
Figure 7:
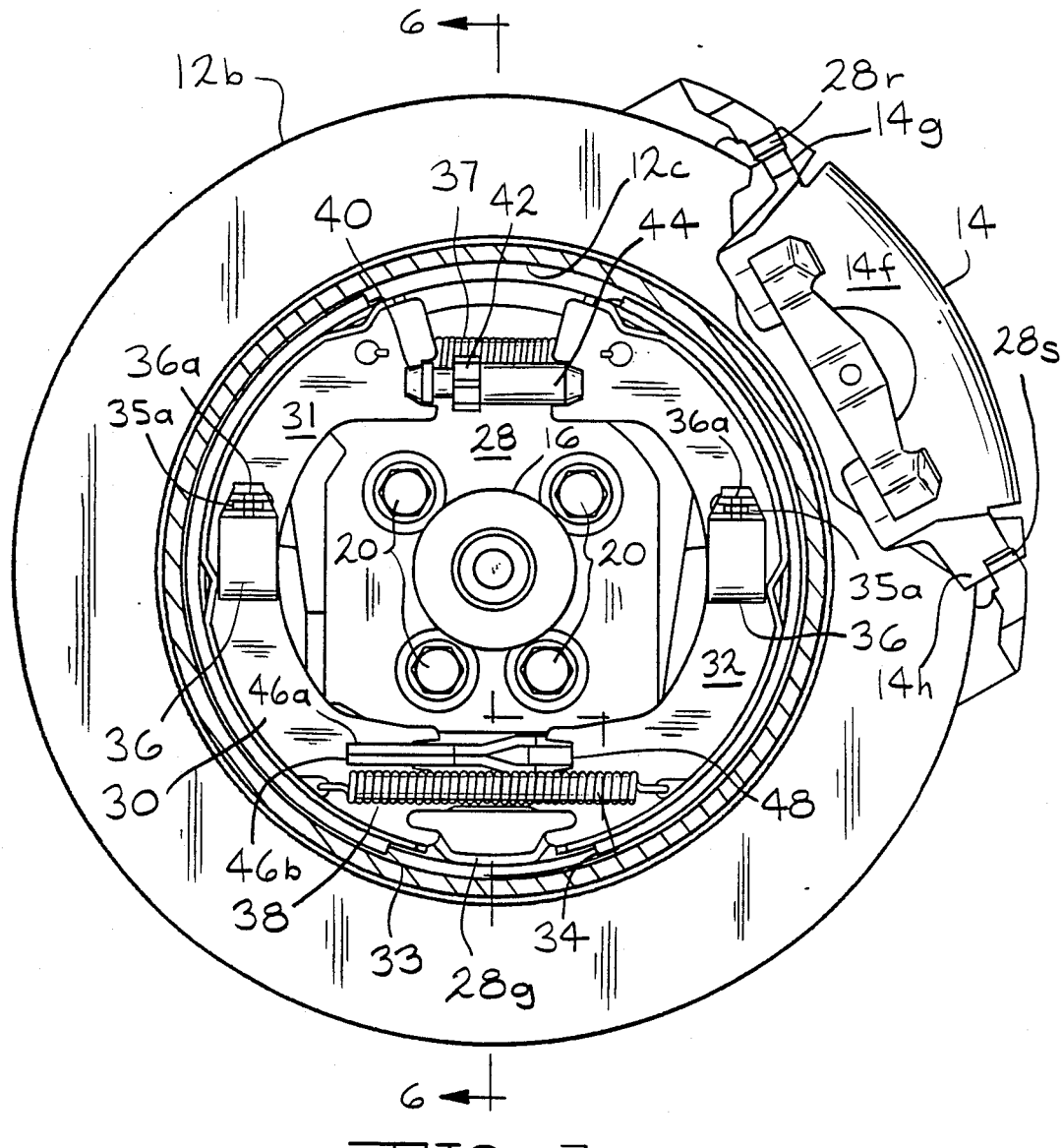
FIG. 7 is a view similar to FIG. 1, taken along the line 7—7 of FIG. 8.

With reference to the drawings, FIG. 1 shows a hydraulic disc brake and drum-in-hat parking brake assembly 10 constructed in accordance with the invention and including a hat-shaped disc 12 and a floating fist type caliper 14. The hat-shaped disc 12 include a hat section 12a and a friction disc portion 12b. A non-rotatable stub axle 16 having a wheel mounting flange 22, better shown in FIG. 6, is secured to a fixed part 18 of the vehicle by a plurality of bolts 20 typically arranged as shown in FIG. 7. The wheel mounting flange 22 is rotatably mounted on stub axle 16 by means of tapered roller bearings 23 and 24. Wheel mounting flange 22 is provided with a plurality of wheel mounting studs 25 typically arranged a shown in FIG. 1. The disc 12 is mounted by its hat section 12a on studs 25 and against wheel mounting flange 22. The hat section 12a of disc 12 is retained on the studs 25 and against the mounting flange 22 by the wheel mounting lug nuts (not shown). Wheel mounting flange 22 is retained on stub axle 16 by nut 26 typically provided with a keyed washer 27 which engages an inner race of the bearing 23.

Figure 8:
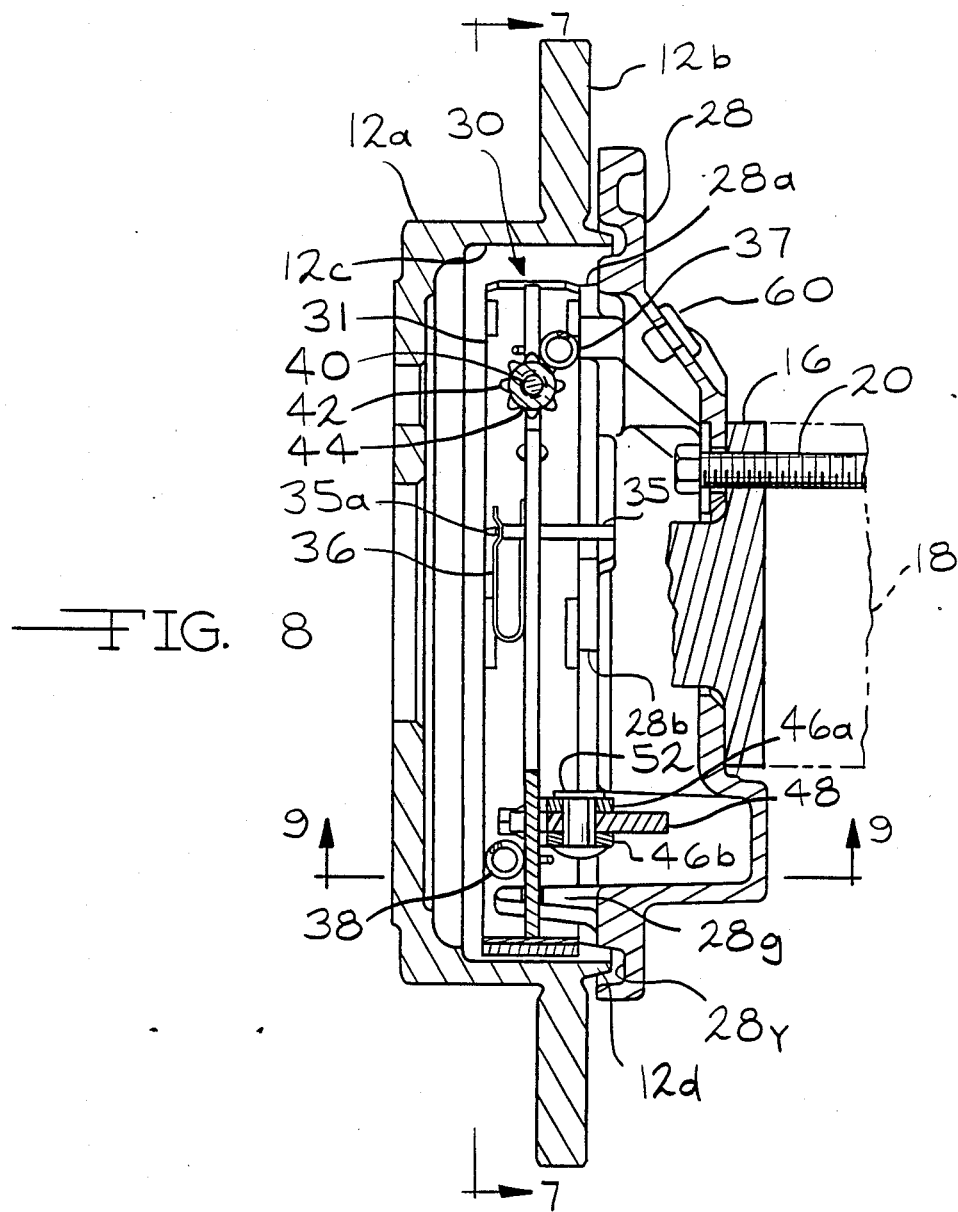
FIG. 8 is a view similar to FIG. 6, but with the stub axle broken away and the wheel hub and bearings omitted.
Figure 9:
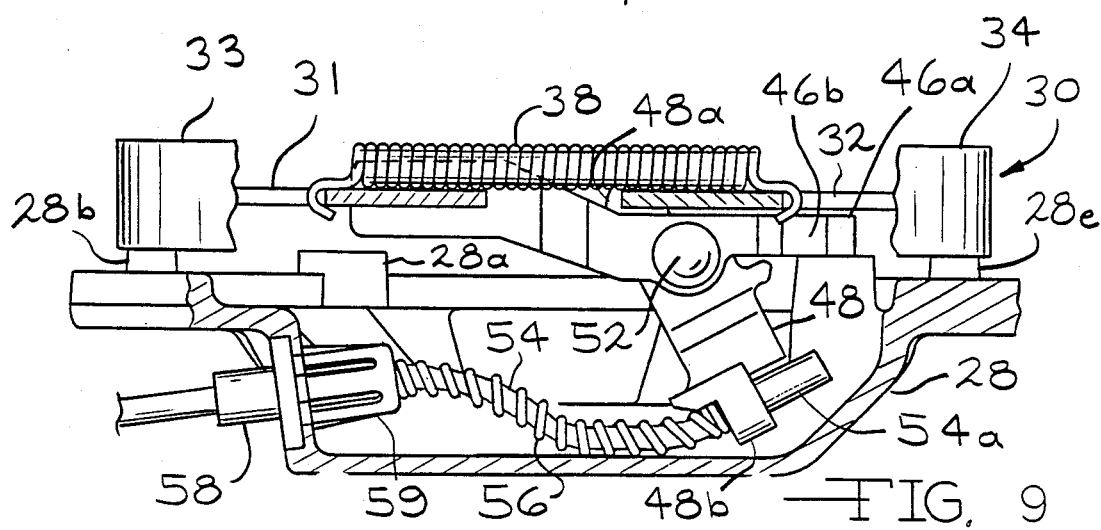
FIG. 9 is an enlarged sectional view taken generally along line 9—9 of FIG. 8, but with the disc omitted.
Figure 10:
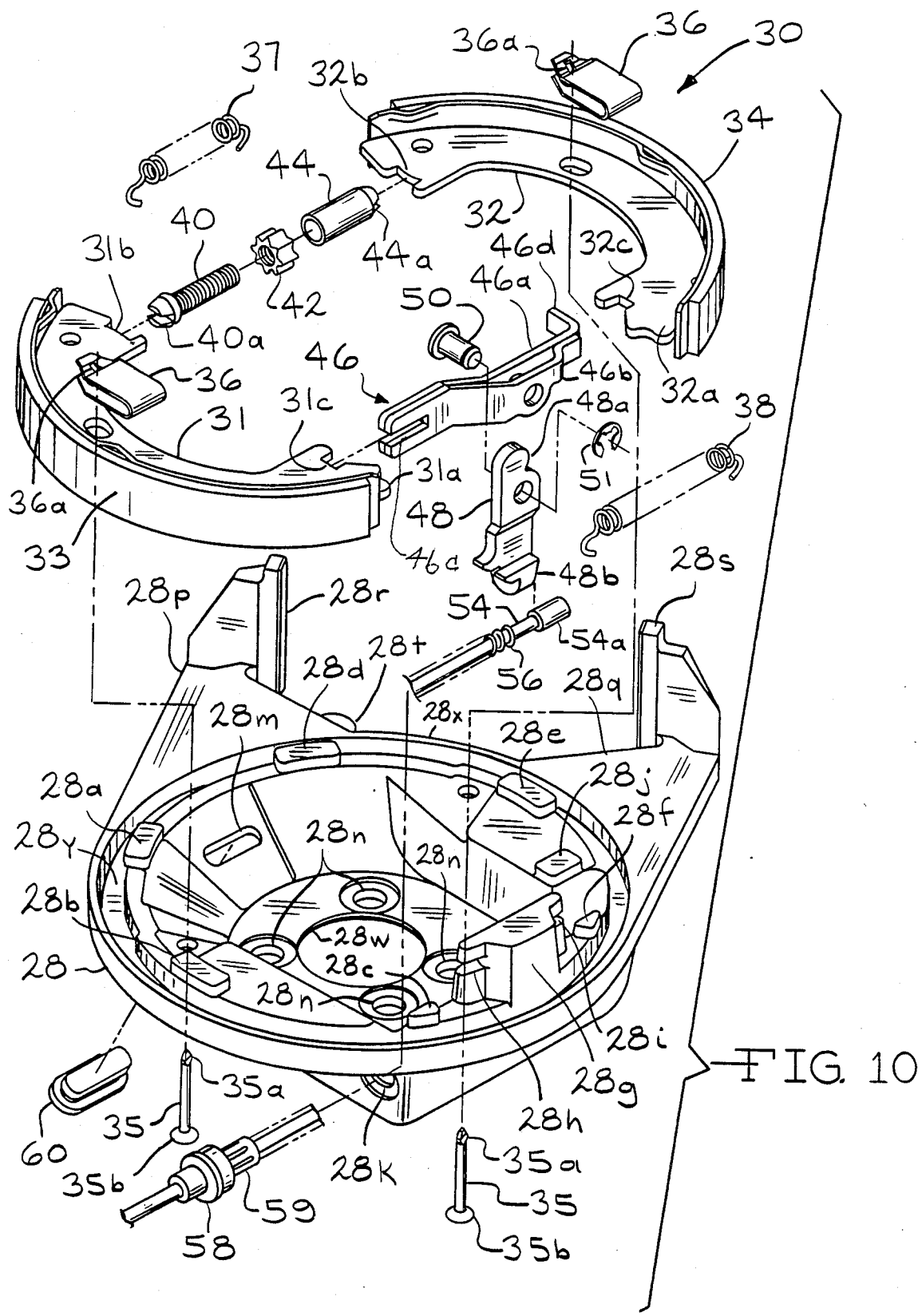
FIG. 10 is an exploded view of the drum-in-that parking brake machanism, the hat-shaped disc being omitted.

Besides securing stub axle 16 to the fixed part 18 of the vehicle, bolts 20 also secure casting 28 (FIGS. 2, 3, 4, 6, 7, 8, 9 and 10) in position. The brake support casting 28 supports the drum-type parking brake mechanism 30 for operative engagement with the inner peripheral surface 12c of the disc hat section 12a. Brake mechanism 30 includes a pair of typical drum brake shoes 31 and 32 having arcuate friction pads 33 or 34 typically attached to rim portions thereof, as best shown in FIGS. 7, 9, and 10. The side of the brake support casting 28 facing disc 12 has a plurality of raised pads 28a, 28b, and 28c (FIG. 10) for engagement with a web portion of brake shoe 31 and a plurality of raised pads 28d, 28e, and 28f for engagement with a web portion of brake shoe 32. Each brake shoe is held in engagement with the respective pads by a fastening pin 35 and a generally U-shaped spring member 36.

Each pin 35 extends through appropriate holes in the brake support casting 28, through the web portion of the respective brake shoe assembly, and through each leg of the respective spring member 36. The hole 36a in an outer leg of each of the spring member has an elongate rectangular shape, and the ends of the pins 35 are compressed or upset to provide free end portions 35a of a generally corresponding elongate rectangular shape. After insertion of pin 35 through spring member 36, the pin is rotated ninety degrees so that the longer dimension of its end portion 35a extends across the shorter dimension of hole 36a in the outer leg of the spring member. Further, the end portion of each pin 35 rests in a groove in an outer leg of the respective spring member 36 after assembly, with the longer dimension of the end portion extending lengthwise of the groove, to prevent inadvertent rotation of the pin 35 to a releasing position, as best shown in FIGS. 7 and 8. Each pin 35 is provided with an enlarged head 35b larger than the corresponding hole in the brake support casting 28.

The brake support casting 28 is also provided with a rotation-preventing abutment 28g slotted at opposite arcuate ends with slots 28h and 28i. The brake shoes 31 and 32 are also held in engagement with the respective pad portions 28a–28f by the disposition of arcuate end portions 31a and 32a of the brake shoe webs respectively in the slots 28h and 28i.

The brake shoes 31 and 32 are urged toward each other by tension spring 37 connecting one pair of adjacent arcuate ends and tension spring 38 connecting the opposite pair of adjacent arcuate ends of the brake shoe webs. Brake shoes 31 and 32 are held apart, adjacent the spring 38, by the torque receiving abutment 28g and adjacent spring 37 by a typical drum brake wear-adjusting mechanism including screw 40 with slotted head 40a receiving therein a notched portion 31b of the web of brake shoe 31, starwheel 42, and sleeve 44 slotted at an end remote from the starwheel 42, at 44a, to receive notched portion 32b of the web of brake shoe 32. As the friction pads 33 and 34 become worn, turning starwheel 42 farther away from the head of the screw 40 moves the sleeve 44 to spread the brake shoes 31 and 32 farther apart.

The means for opening the parking brake mechanism 30 is shown in FIGS. 9 and 10. An elongate floating bracket 46 typically includes two arms 46a and 46b welded together. Bracket 46 is provided with slot 46c for receiving a notched portion 31c of the web of brake shoe 31. At the opposite end, arm 46a is provided with a bent-over tab 46d which engages raised pad 28j on the brake support casting 28. Between the ends, arms 46a and 46b diverge to receive a rotatable lever 48 pivoted on pin 50 and provided with snap ring 51. One end portion 48a of the lever 48 engages notched portion 32c of the web of brake shoe 32. The opposite end 48b of lever 48 is generally U-shaped for receiving parking brake cable 54 having a typically enlarged end 54a as an anchor or stop. A compression spring 56 typically traps cable 54 in the U-shaped end 48b, as shown in FIG. 9. An elastomeric seal 58 for aperture 28k through which cable 54 enters is typically held in place by a spring clip 59.

When cable 54 is pulled by operation of a hand lever accessible from the driver's seat of the vehicle, lever 48 is pivoted in a direction to spread brake shoes 31 and 32 apart thereby engaging the friction pads 33 and 34 with the inner peripheral surface 12c of the disc hat section 12a. The abutment 28g prevents the brake shoes 31 and 32 from rotating in either direction.

Typically, aperture 28m is provided in the brake support casting 28 to afford access to starwheel 42 for manual adjustment. A removable plug 60 normally seals aperture 28m. Four mounting holes 28n are provided in the brake support casting 28 for reception of the bolts 20. Further, opening 28w is provided for reception therethrough of stub axle 16.

Brake support casting 28 further includes a pair of circumferentially spaced arms 28p and 28q extending from the generally circular portion 28x and having a pair of guide rails 28r and 28s respectively at their outer ends. Casting 28 also includes a pair of generally cylindrical ears 28t and 28u (FIGS. 2, 3 and 4) provided with axially extending internally threaded holes. Disc brake caliper 14 is typically attached to casting 28 by a pair of caliper supporting pin assemblies comprising bolt 61 extending through sleeve 63 and threaded respectively into ears 28t and 28u.

Figure 3:
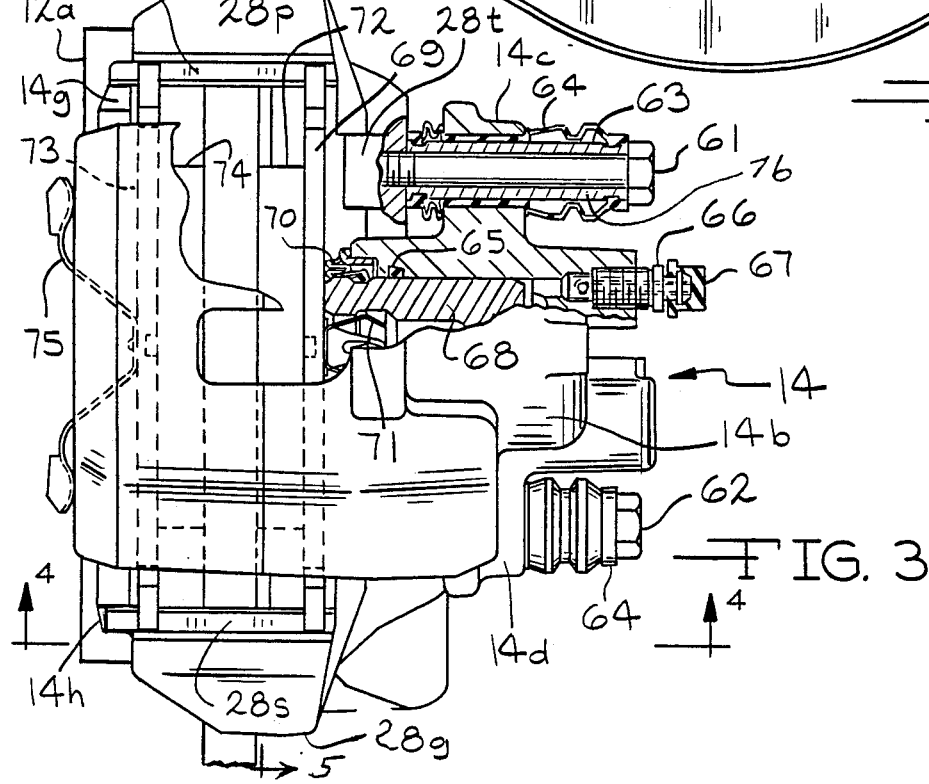
FIG. 3 is an elevational view of the assembly of FIG. 1, taken in the direction arrows 3—3 of FIG. 2, but partly broken away, partly in section, and partially showing the disc.

Inboard leg 14a of the caliper 14 includes a hydraulic cylinder 14b and a pair of apertured lugs 14c and 14d disposed on opposite sides of the cylinder 14b. Each of the lugs 14c and 14d has a typical rubber bushing 64 extending therethrough as shown in FIG. 3. Bushings 64 protect the caliper support pin assemblies against dirt and dust.

Cylinder 14b has an inlet port 14e (FIG. 2) adapted to have a hydraulic line attached thereto. A bleed port is typically provided with a fitting 66 covered with a dust cap 67. A piston 68, fragmentarily shown in FIG. 3, is reciprocably mounted in the cylinder 14b and has an exposed end abutting the inboard friction pad backing plate 69. The periphery of the exposed end of the piston 68 is typically protected by dust boot 70. A spring clip 71 riveted to the backing plate 69 and received in a recess in the exposed end of the piston 68 secures the backing plate 69 to the piston 68. A seal 65 is typically provided on the piston 68 to prevent leakage of hydraulic fluid.

An outboard leg 14f of the caliper 14 has an outboard backing plate 73 secured thereto by a spring clip 75 rivetted to the backing plate. The backing plate 73 has a friction pad 74 bonded thereto and engageable with an outboard side of the friction disc portion 12b.

Figure 2:
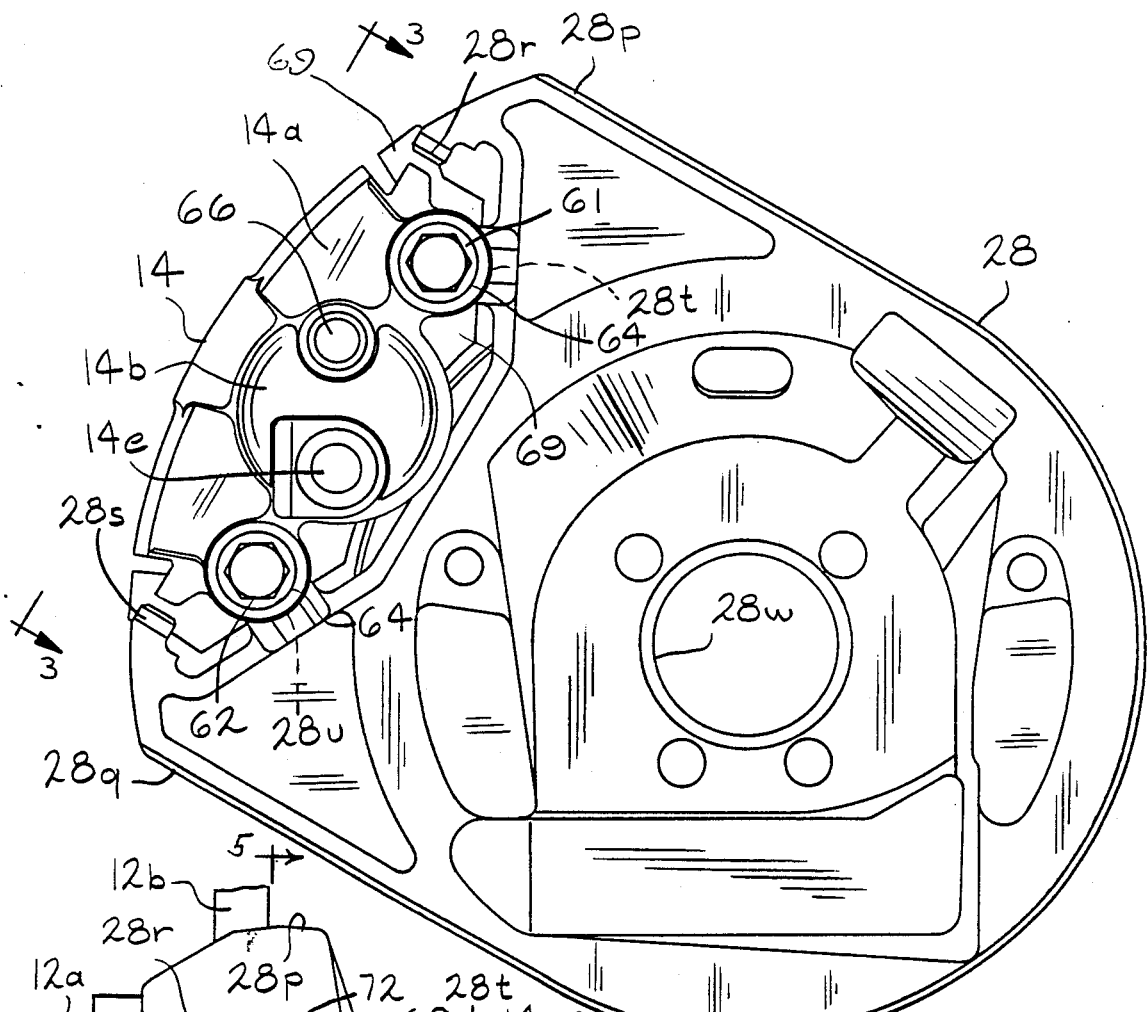
FIG. 2 is an inboard elevational view of the assembly of FIG. 1, the disc and non-rotatable axle being omitted.

As can be seen in FIG. 2 for the inboard friction pad backing plate 69, which is shaped the same as the outboard friction pad backing plate 73, the backing plates are notched at their lower ends to engage three sides of the guide rail 28s and shaped at their upper ends as shown, to embrace two perpendicular sides of the guide rail 28r. Further, the outboard leg 14f has a projection 14g which engages the guide rail 28r on one side and a projection 14h which engages the rail guide 28s on two sides, as shown in FIGS. 1, 3, and 7. The backing plate 73 with two notches 73a and 73b is shown in FIG. 5.

As shown in FIGS. 4, 6, and 8, the disc 12 is provided with an annular projection 12d extending from the inboard side of the friction disc portion 12b oppositely from the hat 12a, and as shown in FIG. 10, the brake support casting 28 is provided with an annular groove 28y. The projection 12d and the groove 28y thereby provide a laybrinthine seal, as can be seen in FIGS. 6 and 8.

Various modifications may be made in the structure shown and described without departing from the scope of the invention.

The invention is claimed as follows:

1. In combination with a flanged non-rotatably mounted axle and a wheel mounting flange rotatably mounted on said axle, the wheel mounting flange having a plurality of arcuately spaced studs adapted to receive a wheel mountable therein, a hydraulic disc brake and drum-in-hat parking brake assembly comprising a casting including a generally circular portion and a pair of opposed spaced arms extending from a generally semicircular section of the circular portion, said circular portion having a central aperture for receiving said axle and being non-rotatably mounted along with a flange of said axle, a generally hat-shaped disc including a hat section and a friction disc portion, said disc being mounted by said hat section on the studs of said wheel mounting flange, a pair of arcuate brake shoes each having an arcuate rim secured to an arcuate outer edge of a flat web and an arcuate friction pad bonded to the rim, said brake shoes being mounted on said casting and disposed within said hat section of said disc for operative engagement of an inner cylindrical surface thereof by said friction pads, a friction pad wear-adjusting mechanism disposed between one arcuate end portion of each of the webs of said brake shoes in operative engagement respectively therewith and including a screw, a sleeve mounted on said screw, and an apertured internally threaded starwheel mounted on said screw for adjusting the combined length of said screw and sleeve, a first tension spring connected at opposite ends respectively to said one arcuate end portion of each of the webs of said brake shoes and urging the webs of said brake shoes toward each other and into engagement respectively with opposite ends of said wear-adjusting mechanism, said casting including a rotation-preventing abutment engaged on opposite sides respectively by another arcuate end portion of each of the webs of said brake shoes, a second tension spring connected at opposite ends respectively to said another arcuate end portion of each of the webs of said brake shoes and urging the webs of said brake shoes toward each other and into engagement respectively with opposite sides of said abutment, a bracket loosely connected to the web of one of said brake shoes adjacent said another arcuate end portion thereof, a brake operating lever pivotally mounted on said bracket and engageable at one end with the web of the other of said brake shoes adjacent said another arcuate end portion thereof, a cable connected to an opposite end of said lever and operable to pivot said lever, move said brake shoes apart against the force of said second tension spring, and press said friction pads against said inner cylindrical surface of said hat section, said casting including a pair of generally cylindrical anchoring ears disposed respectively adjacent said arms and respectively having axially extending internally threaded holes, a generally C-shaped caliper straddling said friction disc portion of said disc and having an outboard leg and an inboard leg disposed respectively on opposite sides of said friction disc portion, an outboard backing plate mounted on said outboard leg on a side thereof facing said friction disc portion, a friction pad bonded to said outboard backing plate for operative engagement with an outboard side of said friction disc portion, said inboard leg including a hydraulic cylinder open at one end and a pair of apertured mounting lugs disposed respectively on opposite sides of said cylinder, a pair of sleeves disposed respectively in said mounting lugs, said mounting lugs being reciprocable on said sleeves, a pair of bolts extending respectively through said sleeves and threaded respectively into said cylindrical ears to mount said sleeves and thereby the caliper on said casting, a piston reciprocably mounted in said hydraulic cylinder and having an exposed end at the open end of the cylinder, an inboard backing plate secured to the exposed end of the piston, a friction pad bonded to said inboard backing plate for operative engagement with an inboard side of said friction disc portion, said arms of said casting respectively including a pair of arcuately spaced guide rails straddling said friction disc portion, each of said backing plates being operatively engaged respectively at opposite ends with said guide rails for reciprocal movement therealong, and said outboard leg having projections respectively adjacent opposite arcuate ends and operatively engaged respectively with said guide rails to absorb braking friction torque in accordance with the direction of rotation of said disc.

2. An assembly as claimed in claim 1, wherein said casting has an annular groove therein adjacent the periphery of said circular portion on a side thereof facing said disc, and said disc has an annular projection thereon extending from said friction disc portion oppositely from said hat section into the annular groove in said casting to form a labyrinthine seal therewith.

3. In combination with a flanged non-rotatably mounted axle and a wheel mounting flange rotatably mounted on said axle, the wheel mounting flange having a plurality of arcuately spaced studs adapted to receive a wheel mountable thereon, a hydraulic disc brake and drum-in-hat parking brake assembly comprising a casting non-rotatably mounted along with a flange of said axle and having said axle extending therethrough, a generally hat-shaped disc mounted on the studs of said wheel mounting flange, a pair of arcuate brake shoes mounted on said casting and disposed within said disc, each brake shoe having an arcuate friction pad bonded thereto for operative engagement with an inner cylindrical surface of said disc, each of said brake shoes having one arcuate end portion engaging said casting whereby rotation thereof under the influence of braking friction torque is prevented, and a generally C-shaped caliper directly mounted on said casting in straddling relationship to said disc for reciprocal movement relatively thereto, said caliper including an outboard backing plate having a friction pad operatively engageable with an outboard side of said disc and a hydraulic cylinder having a piston therein secured to an inboard mounting plate having a friction pad operatively engageable with an inboard side of said disc, said backing plates being guided for reciprocal movement adjacent opposite ends by said casting.

4. An assembly as claimed in claim 3, wherein said casing has an annular groove therein facing said disc, and said disc has an annular projection extending into said groove to form a labyrinthine seal therewith.

5. A casting particularly adapted for use in a hydraulic disc brake and drum-in-hat parking brake assembly and comprising a generally circular portion, a pair of opposed spaced arms extending from a generally semicircular sector of the circular portion, the circular portion having a central aperture for receiving an axle, a plurality of holes arcuately spaced around the central aperture for receiving mounting bolts for mounting the casting, and a rotation-preventing abutment portion for operative engagement on opposite sides respectively by one arcuate end portion of each of a pair of arcuate brake shoes, and a pair of anchoring ears disposed respectively adjacent said arms and respectively having internally threaded holes for receiving mounting bolts for mounting a disc brake caliper on the casting, said arms respectively including a pair of arcuately spaced guide rails for operative engagement by reciprocable friction pad backing plates of a disc brake caliper.

6. A casting as claimed in claim 5, wherein said circular portion is provided adjacent its periphery with an annular groove adapted to be part of a labyrinthine seal.

7. A casting particularly adapted for use in a hydraulic disc brake assembly having a drum-in-hat parking brake comprising a generally circular portion, a pair of opposed spaced arms extending from a generally semicircular sector of the circular portion, the circular portion having a central aperture for receiving an axle, a plurality of holes arcuately spaced around the central aperture for receiving mounting bolts for mounting the casting, and a rotation-preventing abutment portion for operative engagement on opposite sides respectively by one arcuate end portion of each of a pair of arcuate brake shoes, and means for mounting said disc brake assembly upon said casting, said arms respectively including means for transferring braking torque from said disc brake assembly to said circular portion.

* * * * *